United States Patent Office

3,682,863
Patented Aug. 8, 1972

3,682,863
BUTANE DIOL-TEREPHTHALIC-ISOPHTHALIC-SEBACIC ACID
John J. McHale, deceased, late of Blackwood, N.J., by Mary E. McHale, administratrix, Blackwood, N.J., assignor to E. I. du Pont de Nemours and Company, Wilmington, Del.
No Drawing. Continuation-in-part of applications Ser. No. 308,321, Sept. 12, 1963, and Ser. No. 347,679, Feb. 27, 1964. This application Feb. 24, 1969, Ser. No. 801,869
Int. Cl. C08g 17/08
U.S. Cl. 260—75 R                    3 Claims

ABSTRACT OF THE DISCLOSURE

A hot melt shoe adhesive composition consisting essentially of a copolyester of a diol component composed of at least 80 mole percent of butanediol and an acid mixture consisting essentially of 25–59 mole percent terephthalic acid, 25–65 mole percent of isophthalic acid and 5–25 mole percent of a $C_6$–$C_{36}$ aliphatic dicarboxylic acid.

CROSS REFERENCE TO RELATED APPLICATIONS

This application is a continuation-in-part of copending application Ser. No. 308,321, filed Sept. 12, 1963, now abandoned; and Ser. No. 347,679, filed Feb. 27, 1964, now Pat. No. 3,436,301.

BACKGROUND OF THE INVENTION

This invention relates to a new copolyester and to laminated shoe assemblies in which the shoe sole is adhesively bonded to the shoe upper with a copolyester of this invention. More particularly, this invention relates to a thermoplastic esterification product of a mixture of dicarboxylic acids and an aliphatic diol wherein the dicarboxylic acids are a mixture of terephthalic acid, isophthalic acid, and a $C_6$–$C_{36}$ aliphatic dicarboxylic acid and wherein the major molar portion of the aliphatic diol is a butane diol.

It is well known in the art that benzenedicarboxylic acids can be reacted with diols to form esterification products that can be used as adhesives, or can be extruded to form films or fibers. It is also known that a mixture of isophthalic acid, terephthalic acid and a plurality of aliphatic dicarboxylic acids can be esterified to form an adhesive composition. However, the copolyesters known in the adhesive art are not suitable to adhere shoe soles to shoe uppers, particularly when the adhesive is applied to only one of the lamina. Presently the shoe industry is attaching soles by coating both the upper and the sole with an adhesive, the adhesive is then dried, and the upper and the sole are heat activated and bonded together in a shoe press. There is a definite need in the shoe industry for an adhesive which could be applied to only one of the lamina. Preferably the sole, and still would adequately adhere the two components together. Obviously, an adhesive of this type would eliminate one step from the coating operation and would result in savings in production costs. To accomplish this, the adhesive must have the following properties: a low melt viscosity so that the uncoated surface of laminate will be thoroughly wetted thereby permitting adequate adhesion; a low activation temperature (i.e., the temperature at which the adhesive becomes tacky) so that a coated component, generally the sole, can be safely physically handled by an operator when making the laminated shoe assembly by using conventional sole laying equipment; a rapid setting period so that the sole will remain in contact with the upper and will not "leg" away after the assembly is removed from the shoe press; remain flexible and non-brittle for long periods of time under normal use conditions and over a temperature range from −20° F. to 120° F.

SUMMARY OF THE INVENTION

The copolyester adhesive composition of this invention meets all of the above rigid requirements for a one side applied adhesive for attaching soles to shoe uppers. The adhesive is an esterification product of a butane diol or a diol mixture comprising at least 80% butane diol and dicarboxylic acid mixture containing critical proportions of terephthalic acid, isophthalic acid, and a $C_6$–$C_{36}$ aliphatic dicarboxylic acid. The proportions of acid components in the monomer mixture are as follows:

| | Mol percent of acid mixture |
|---|---|
| Terephthalic acid | 25–59 |
| Isophthalic acid | 25–65 |
| $C_6$–$C_{36}$ aliphatic dicarboxylic acid | 5–25 |

DESCRIPTION OF THE INVENTION

For efficient polymerization when forming the copolyester, there should be an excess of the diol of about 1½ mols of diol to 1 mol of acid. If more than one diol is used then at least 80 mol percent of the diol must be butane diol. The range of the physical properties of the adhesive are summarized generally as follows:

| | |
|---|---|
| Stick melt temperature, ° C. | 70–160 |
| Relative viscosity | 1.3–1.6 |

The diol component of the monomer reaction mixture can be either a butane diol or a mixture of at least 80 mol percent butane diol with the remainder being another $C_2$–$C_{10}$ diol, preferably an alkane diol. The preferred diol is a 1,4-butane diol since esters of this invention made with this diol retain their adhesive properties for long periods of time and do not embrittle but remain flexible. Amounts up to 20 mol percent of another diol can be added to the butane diol with the resulting copolyester still retaining substantially the same properties as those made from butane diol.

The terephthalic acid component of the monomer reaction mixture is present within the range of about 25–59 mol percent with the preferred range being about 40–55 mol percent based on the total dicarboxylic acid present when used as an adhesive for leather soles and about 25–40 mol percent when used as an adhesive for composition soles, (e.g., soles that have as a base natural rubber, styrene butadiene rubber, a combination of natural rubber and styrene butadiene rubber, or a vinyl chloride/ vinyl acetate copolymer).

The isophthalic acid component of the monomer reaction is present within the range of about 25–65 mol percent. The preferred range is about 25–50 mol percent when used as an adhesive for leather soles and about 35– 65 mol percent when used with composition soles. In these ranges, polymers are produced which are tough, flexible and crystalline.

The aliphatic dicarboxylic acid most useful in this invention is sebacic acid in the range of about 5–25 mol percent with the preferred range being about 7–23 mol percent, based on the total dicarboxylic acid present for both leather and composition soles. Other aliphatic dicarboxylic acids from $C_6$–$C_{36}$ can be used with, or as a substitute for, the sebacic acid but the total aliphatic dicarboxylic acid weight contribution must be equivalent to that which would be contributed by sebacic acid alone. For example, the weight contribution of 3 mol percent of a saturated $C_{36}$ dicarboxylic acid would be approximately the same as 10 mol percent of sebacic acid. The aliphatic dicarboxylic acid component when used in amounts within the limits set forth and particularly within the preferred limits gives a copolyester which is tough, flexible and which has a sharp melting point.

To be most useful on commercial adhesive application equipment, which is used to place an adhesive on a shoe sole, the copolyester should have a stick melt temperature in the range of about 70–160° C. The stick melt temperature of the copolyester is about the lowest temperature at which an adhesive bond can be obtained under manufacturing conditions. The preferred range is about 105–140° C. for leather soles and 70–90° for rubber or vinyl based composition soles. The relative viscosity of the polymer should be in the range of 1.3–1.6 for adequate adhesion with the preferred viscosity being about 1.5. The preferred viscosity represents a copolyester adhesive with an optimum molecular weight for shoe adhesive and which will adequately wet the shoe upper when the sole coated with the heat activated copolyester is applied.

The copolyester of this invention can be used as an adhesive to bond all types of natural and synthetic leathers, woven materials, non-woven materials, and rubber or vinyl based compositions.

The one-way manufacturing technique of making shoes with the copolyester of this invention is to roller coat or rotogravure print the polymer onto the outer periphery of the inner side of the sole in about a one-half inch wide strip placing about 1½–2½ grams of adhesive onto the sole. This amount will vary with shoe size. Any method can be used to place the adhesive on the sole such as spraying, stamping, extruding or hand application. After the polymer is applied to the sole, it hardens and loses its tack rapidly which allows the soles to be stacked and stored for periods of time without adhering to each other. Before the sole is applied to the shoe upper, the polymer is usually activated, i.e., made tacky, by some heating means such as an infrared lamp or a radiant heater. It is also possible, though not preferred, to use a solvent to activate the adhesive. The sole is then positioned on the shoe upper and the assembly is placed in a shoe press which holds the upper and the sole in contact for about 10–25 seconds under about 40–100 pounds per square inch pressure. The bonded shoe assembly is then removed from the press and cooled and the remainder of the shoe is then completed in subsequent operations.

The copolyester of this invention can be used to adhere composition soles that are of a natural rubber base, a styrene butadiene rubber base, a combination of natural rubber and styrene butadiene rubber base, or a vinyl chloride/vinyl acetate copolymer base. Sometimes a primer is first applied to obtain better adhesion. A useful primer is a mixture of an acrylonitrile butadiene copolymer and a butyl phenol resin in the range of 40–60 weight percent copolymer to 60–40 weight percent resin with the preferred being about 45 weight percent copolymer and 55 weight percent resin. Neoprene based primers are also useful for this purpose.

The copolyesters of this invention are prepared by a two-stage operation. In the first stage hydroxyl alkyl esters of terephthalic acid, isophthalic acid, and the $C_6$–$C_{36}$ aliphatic acid are formed under normal room atmospheric conditions; this is followed by the polymerization of the esters under a vacuum of about 1.0 mm. Hg or less. The bis-hydroxy alkyl esters of the acids can be obtained by either a transesterification of the dimethyl esters of the acids with the diol and condensing out methanol or by direct esterification of the acids with the diol and condensing out water.

The preferred method is transesterification of the dimethyl ester of the respective acids since the reaction is completed at a more rapid rate than with direct esterification. In preparing monomers by transesterification, the diol and the dimethyl esters of the acids are charged into the reaction vessel along with a catalyst such as calcium acetate or litharge. Litharge is preferred since it allows complete formation of the monomers in the reaction mixture and allows for higher molecular weight polymers in the polymerization step. The reaction mixture is heated to about 150° C. as methanol is distilled from the mixture. The temperature of the vapors being distilled are held at about 66° C. until the methanol is removed from the batch. The monomer stage is complete when the theoretical amount of methanol is removed as indicated by a sharp rise in the vapor temperature.

When the monomers are prepared by direct esterification, the acids and the diol are charged into a reaction vessel and the batch temperature is increased slowly while the vapor temperature is held at 100° C. to remove water. No catalyst is required in this method. The acid number of the batch is repeatedly determined and when a number less than 1.0 is obtained, the monomer stage is complete.

Polymerization of the monomers formed by either direct esterification or by transesterification is carried out by the same method. The monomers are either removed from the reaction vessel and placed in another suitable vessel or are retained within the same vessel. Polymerization is accomplished by heating the batch and applying a vacuum. The monomers are heated to about 250° C. under atmospheric conditions and as much of the unreacted diol is distilled off as possible. Vacuum is then applied and slowly increased to less than 1.0 mm. Hg which distills additional amounts of diol out of the batch. The polymerization is complete when the relative viscosity of the batch reaches about 1.3–1.6. The relative viscosity is the ratio of the efflux time of 0.3 gram of polymer dissolved in 50 ml. of "Fomal" (41.2% by weight 2,4,6-trichlorophenol+58.8% phenol) at a temperature of 77° F. to the efflux time of the pure solvent using a capillary type Ostwald-Cannon-Fenske Viscometer.

After the polymer is formed, the stick melt temperature and the flow point are determined. To determine the stick melt temperature, a small piece of polymer is rubbed gently across a glass plate of a Fisher-Johns Melting Point Apparatus and the temperature at which the polymer leaves a trail of molten resin on the glas is termed the stick melt temperature.

The flow point of the polymer can be determined by placing a small piece of polymer between two glass slides which are attached to a Fisher-Johns Melting Point Apparatus. The temperature at which the polymer begins to flow is the flow point.

The invention is further illustrated by the following examples:

EXAMPLE 1

The following ingredients are charged into a reaction vessel equipped with a distillation column, an agitator and an inlet for nitrogen so that the batch can be blanketed with the inert gas:

| | Parts by weight |
|---|---|
| Dimethyl terephthalate | 87.30 |
| Dimethyl isophthalate | 87.30 |
| Dimethyl sebacate | 23.00 |
| 1,4-butane diol | 135.00 |
| Litharge | 0.45 |
| Total charge | 333.05 |

The batch is agitated, blanketed with nitrogen, and heated to about 150° C. as methanol is distilled from the batch through a column packed with glass. The temperature of the vapor being removed from the batch is measured and maintained at about 66 C. to insure that only methanol is being distilled. After the theoretical amount of methanol is removed which is 64 parts by weight, the formation of the monomeric esters of the acids is considered complete. The monomeric materials are heated to about 250° C. under atmospheric pressure and $N_2$ blanket and 1,4-butane diol is distilled from the reactants. When no more diol is distilled off at atmospheric pressure, a vacuum is applied to the reaction vessel slowly and increased until the pressure is less than 1.0 mm. H. The polymerization is continued until 45 parts by weight of unreacted 1,4-butane diol are removed and the relative viscosity of the batch reaches a constant level of about 1.4.

In the reaction vessel the viscosity is determined by the revolutions per minute of the agitator which is driven with an air motor supplied with constant air pressure at 60 p.s.i. R.p.m. of the agitator and relative viscosity has been predetermined and corelated making this measurement possible. The relative viscosity of the batch is a better guide in determining the correct molecular weight of the polymer than the theoretical amount of diol being removed since a small change in the amount of diol, 0.1 part or less, makes a large difference in the molecular weight of the polymer.

The molar proportions of the dicarboxylic acid components which correspond to the bis(butane diol) esters of the acids in the reaction are about:

| | Mol percent |
|---|---|
| Terephthalic acid | 45 |
| Isophthalic acid | 45 |
| Sebacic acid | 10 |
| | 100 |

The copolyester formed has the following characteristics.

| | |
|---|---|
| Relative viscosity | 1.46 |
| Stick melt temperature, ° C. | 104 |
| Flow point, ° C. | 111 |

Women's shoes are made with the copolyester of this example by coating the leather sole with 1½–2½ grams of polymer in an approximate one half inch wide strip along the periphery of the sole. The bottom of the leather upper which contacts the adhesive on the sole is then buffed until any dye and waxes on the surface of the leather are removed. The polymer on the sole is then activated by heating to the flow point of the polymer and the sole is positioned on the shoe upper and the shoe assembly is placed in a press for about 15 seconds under about 60–100 p.s.i. total pressure. The shoe then is removed from the press and kept at room temperature for about 24 hours, following which the strength of adhesion of the sole to the upper is determined.

The toe of the upper is split away from the sole and the two ends are firmly attached in the jaws of an Instron Testing Machine and peeled apart at a jaw separation rate of 2 inches/minute. The maximum force required to separate the sole from the shoe is a measure of the adhesive strength. If the sole is properly bonded to the shoe upper, failure usually occurs within the substrate of the upper or within the substrate of the sole rather than in the adhesive layer or at the interface of the adhesive layer and the component. Five shoes are prepared and tested in this manner with the following results:

| Sample [1]: | Adhesion (pounds required to separate sole from upper) |
|---|---|
| #1 | 40.0 |
| #2 | 36.0 |
| #3 | 36.5 |
| #4 | 36.5 |
| #5 | 44.0 |

[1] In all samples, no failure was noted in the adhesive layer and only substrate failure occurred.

Women's shoes with leather uppers and leather soles are made with the copolyester of this example and in the same manner as previously described. These shoes are placed in an oven, kept at 120° F. and low humidity, and are examined weekly for delamination of the sole and the upper. After two weeks of testing, no delamination occurred and no significant loss in properties of the adhesive occurred.

Women's shoes with leather uppers and leather soles are made with the copolyester of this example and by the same method as previously described. These are placed in an oven maintained at 120° F. and at 100% relative humidity. The shoes are checked daily for two weeks for delamination but none occurred and the soles remained firmly bonded to the upper throughout the test.

200 pairs of women's shoes of all sizes with leather uppers and leather soles are made with the copolyester of this example by the method as previously described. These shoes are given to secretaries within the Wilmington, Del. area for test purposes. At weekly intervals reports are made as to the condition of the shoes. After 6 weeks and with an average of 80 hours to 250 hours wear, no delamination of the sole and the upper has occurred. The adhesive strength of the worn shoes is tested on an Instron Machine as previously described. Again, only substrate failure in either the sole or the upper occurred and no failure was noted in the adhesive layer.

EXAMPLE 2

The following ingredients are charged into a reaction vessel and the monomer formation of the esters and the polymerization of the esters are carried out as in Example 1.

| | Parts by weight |
|---|---|
| Dimethyl terephthalate | 71.78 |
| Dimethyl isophthalate | 77.60 |
| Dimethyl sebacate | 52.90 |
| 1,4 butane diol | 135.00 |
| Litharge | .45 |
| Total charge | 337.73 |
| Methanol removed | 64.00 |
| 1,4-butane diol removed | 45.00 |

The molar proportion of the dicarboxylic acid components which correspond to the bis(butane diol) esters of the acids in the reaction are about:

| | Mol percent |
|---|---|
| Terephthalic acid | 37 |
| Isophthalic acid | 40 |
| Sebacic acid | 23 |
| | 100 |

The copolyester formed has the following characteristics:

| | |
|---|---|
| Relative viscosity | 1.49 |
| Stick melt temperature, ° C. | 68 |
| Flow point, ° C. | 87 |

Women's shoes are constructed with this polymer as in Example 1 except that the shoe upper is a vinyl coated fabric and the sole is a composition material containing a substantial proportion of styrene-butadiene rubber. To obtain adequate adhesion between the sole and the upper a thin coat of primer is first applied to the sole in about a ½ inch wide strip along the periphery of the sole. The primer is a mixture of about 45 percent by weight of an acrylonitrile/butadiene copolymer and about 55 percent butyl phenol resin. After the primer has dried about 1½ to 2½ grams of the polymer of this example are coated onto the sole and the construction of the shoe is carried out as in Example 1.

The bond strength of the shoe sole and upper are measured as in Example 1 on an Instron Testing Machine. Only substrate failure in either the sole or the upper occurred and no failure was noted in the adhesive layer.

EXAMPLE 3

The following ingredients are charged into a reaction vessel and the monomer formation and polymerization of the products are carried out as in Example 1:

| | Parts by weight |
|---|---|
| Dimethyl terephthalate | 77.60 |
| Dimethyl isophthalate | 87.30 |
| Dimethyl sebacate | 34.50 |
| 1,4-butane diol | 135.00 |
| Litharge | 0.45 |
| Total charge | 334.85 |
| Methanol removed | 64.00 |
| 1,4-butane diol removed | 45.00 |

The molar proportions of the dicarboxylic acid components which correspond to the bis(butane diol) esters of the acids in the reaction are about:

| | Mol percent |
|---|---|
| Terephthalic acid | 40 |
| Isophthalic acid | 45 |
| Sebacic acid | 15 |
| | 100 |

The copolyester formed has the following characteristics:

| | |
|---|---|
| Relative viscosity | 1.49 |
| Stick melt temperature, °C. | 93 |
| Flow point, °C. | 98 |

Women's shoes of leather uppers and leather soles are constructed as in Example 1 and all of the laminates are found to have adequate adhesion and no delamination of the sole and upper occurred after use.

EXAMPLE 4

The following ingredients are charged into a reaction vessel and the monomer formation of the esters and the polymerization of the esters are carried out as in Example 1.

| | Parts by weight |
|---|---|
| Dimethyl terephthalate | 119.29 |
| Dimethyl isophthalate | 75.92 |
| Dimethyl sebacate | 25.72 |
| 1,4-butane diol | 150.94 |
| Litharge | 0.50 |
| Total charge | 372.37 |
| Methanol removed | 71.56 |
| 1,4-butane diol removed | 50.31 |

The molar proportion of the dicarboxylic acid components which correspond to the bis(butane diol) esters of the acids in the reaction are about:

| | Mol percent |
|---|---|
| Terephthalic acid | 55 |
| Isophthalic acid | 35 |
| Sebacic acid | 10 |

The copolyester formed has the following characteristics:

| | |
|---|---|
| Relative viscosity | 1.49 |
| Stick melt temperature, °C. | 127 |
| Flow point, °C. | 140 |

Women's shoes of leather uppers and leather soles are constructed as in Example 1 and all of the laminates are found to have adequate adhesion and no delamination of the sole and upper occurred after use.

EXAMPLE 5

The following ingredients are charged into a reaction vessel and the monomer formation of the esters and the polymerization of the esters are carried out as in Example 1.

| | Parts by weight |
|---|---|
| Dimethyl terephthalate | 64.55 |
| Dimethyl isophthalate | 118.35 |
| Dimethyl sebacate | 38.26 |
| 1,4-butane diol | 147.93 |
| Litharge | 0.50 |
| Total charge | 369.59 |
| Methanol removed | 70.98 |
| 1,4-butane diol removed | 49.91 |

The molar proportion of the dicarboxylic acid components which correspond to the bis(butane diol) esters of the acid in the reaction are about:

| | Mol percent |
|---|---|
| Terephthalic acid | 30 |
| Isophthalic acid | 55 |
| Sebacic acid | 15 |
| | 100 |

The copolyester formed has the following characteristics:

| | |
|---|---|
| Relative viscosity | 1.47 |
| Stick melt temperature, °C. | 79 |
| Flow point, °C. | 82 |

Women's shoes with leather uppers and composition soles, in which the soles contain a substantial portion of styrene butadiene rubber, are constructed as in Example 1. However, no primer is used between the copolyester adhesive and the composition sole.

The bond strength of the shoe sole and upper is measured as in Example 1 on an Instron Testing Machine. Five shoes are tested with the following results:

| Sample:[1] | Adhesion (pounds required to separate sole from upper) |
|---|---|
| #1 | 26.5 |
| #2 | 20.5 |
| #3 | 19.0 |
| #4 | 19.0 |
| #5 | 19.5 |

[1] In all samples, no failure was noted in the adhesive layer and only substrate failure occurred.

Wear tests show no delamination and indicate adequate adhesion of the sole to the upper.

What is claimed is:

1. A thermoplastic copolyester which is the reaction product of a diol component containing at least 80 mol percent butane diol and an acid mixture consisting essentially of 25–59 mol percent terephthalic acid, 25–65 mol percent isophthalic acid and 5–25 mol percent sebacic acid.

2. The copolyester of claim 1 wherein the acid mixture consists essentially of 40–55 mol percent terephthalic acid, 20–50 mol percent isophthalic acid and 7–23 mol percent sebacic acid.

3. The copolyester of claim 1 wherein the acid mixture consists essentially of 25–40 mol percent terephthalic acid, 35–65 mol percent isophthalic acid and 7–23 mol percent sebacic acid.

References Cited

UNITED STATES PATENTS

| 3,235,520 | 2/1966 | Crowell. | |
| 3,421,974 | 3/1969 | Wiener | 161—226 |

MELVIN GOLDSTEIN, Primary Examiner

U.S. Cl. X.R.

161—226